No. 20,330. PATENTED MAY 25, 1858.
W. CLEMSON.
MACHINE FOR GRINDING CIRCULAR SAWS.
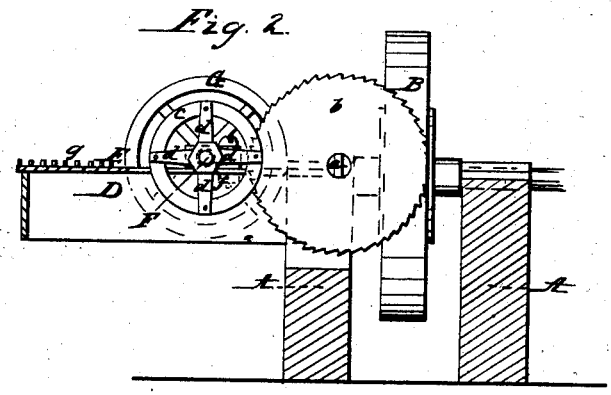
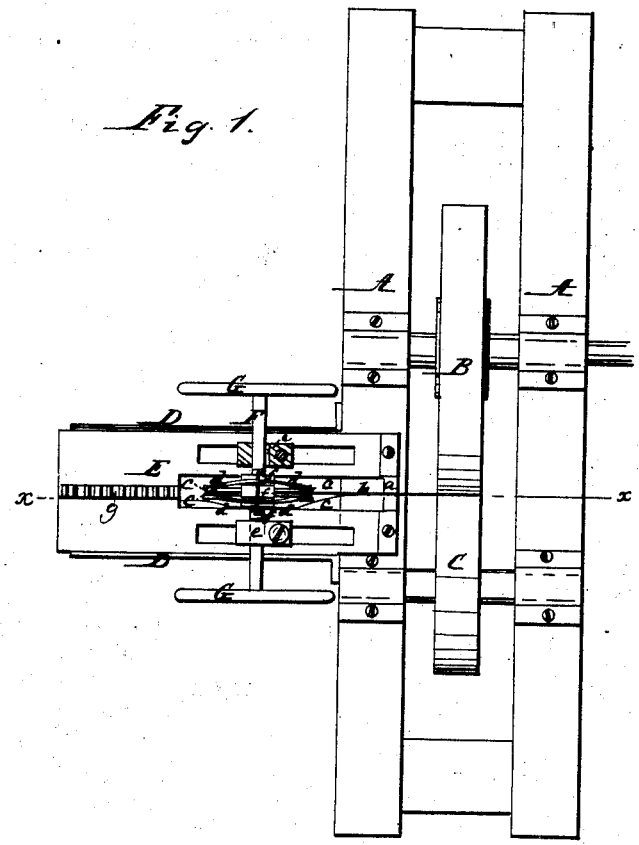

UNITED STATES PATENT OFFICE.

W. CLEMSON, OF EAST WOBURN, MASSACHUSETTS.

MACHINE FOR GRINDING SAWS.

Specification of Letters Patent No. 20,330, dated May 25, 1858.

*To all whom it may concern:*

Be it known that I, WILLIAM CLEMSON, of East Woburn, in the county of Middlesex and State of Massachusetts, have invented a new and useful Improvement in Machines for Grinding Circular Saws; and I do hereby declare that the following is a full, clear, and exact description of the same, reference being had to the accompanying drawings, making part of this specification, in which—

Figure 1, is a plan of a machine having my invention applied. Fig. 2, is a vertical section of the same, in the line $x$, $x$, of Fig. 1.

Similar letters of reference denote like parts in both figures.

This invention consists in the employment, in a machine for grinding circular saws, of a revolving friction clamp, applied as hereinafter described, to receive motion from the saw through the agency of friction, and to serve by its momentum to control and render uniform or nearly so the velocity of revolution of the saw.

The invention is applicable to that machine for which I received Letters Patent of the United States, dated May 27th, 1856, and may be applied to some others.

To enable others skilled in the art to make and use my invention, I will proceed to describe its construction and operation.

A, is the main frame of the machine; B is the grindstone; and C, the roll which holds the saw to the stone and produces or assists in producing the rotary motion of the saw. $a$, is the flat pivot upon which the saw $b$, revolves. All of these parts correspond in all essential particulars with the machine described in my beforementioned Letters Patent.

D, D, are ways attached to the main framing A, A, and arranged parallel to the axes of the grindstone B, and roll C, to receive the sliding plate E, which carries the pivot $a$, on which the saw revolves, and also carries the revolving clamp which constitutes my invention. This clamp is composed of two rings $c$, $c$, made of stout steel plate of about one foot in diameter externally and about one inch and a half in depth radially, attached by arms $d$, $d$, formed of plates of lighter steel, to a shaft F, which is arranged parallel with the spindle $a$, in bearings $e$, $e$, on the sliding plate E. These clamps are tempered, and their arms $d$, $d$, so curved or set as to press the rings $c$, $c$, together. The two plates of which the arms $d$, $d$, form parts are secured to shaft F by three nuts $f$, $f$, $f$, as shown in Fig. 1. The edges of the rings $c$, $c$, are beveled inward to allow the edge of the saw to enter easily between them. The shaft F has a heavy fly wheel G at each end, and it is fitted to its bearings $e$, $e$, in such a manner as to be capable of longitudinal as well as lateral play. The bearings $e$, $e$, are adjustable in slots in the sliding plate E, to bring the clamp nearer to or farther from grindstone B, and roll C. The plate E is furnished with a rack $g$, to be moved by a pinion to move the saw across the face of the stone to grind the whole face of the saw.

The operation of the revolving clamp is as follows: The rotary motion of the saw produced by the roll C, and grindstone B, operating in combination, produces a rotary motion of the clamp by the friction of the saw between its rings, which friction assists the roll in counteracting the effect of the high velocity of the grindstone upon the motion of the saw and causes the saw to move at about the same speed as the roll. If the saw-plate is not of uniform thickness, as often occurs, the natural tendency of the saw is to rotate faster when the thicker portions are presented to it and slower when the thinner portions are presented; hence there is a tendency to grind the thinner portions more than the thicker ones, but this is counteracted by the clamp which by means of its fly-wheels G, G, is caused to acquire a steady and unvarying degree of momentum, which is sufficient to hold the saw back when it tends to move too fast and to help it forward when it tends to move too slowly, thus preventing the thick parts running away with the stone and thereby escaping the grinding operation, and helping the thin parts past the stone to prevent their being ground too much, and hence causing the saw to be ground to a uniform thickness.

What I claim as my invention, and desire to secure by Letters-Patent, is:—

The employment of a revolving friction clamp, applied to the saw in the manner substantially as described, to receive rotary motion from the saw and to control the revolution of the saw by the momentum it acquires by such rotary motion, as herein fully explained.

WM. CLEMSON.

Witnesses:
   D. MACFARLANE,
   JESSE NASH.